(12) United States Patent
Hsieh et al.

(10) Patent No.: US 8,768,619 B2
(45) Date of Patent: Jul. 1, 2014

(54) ROAD SIDE DATA EXCHANGE NET AND METHOD THEREOF

(75) Inventors: Yu-Tsen Hsieh, Tainan (TW); Chih-Wei Hsu, Hsinchu County (TW); Yuan-Po Cheng, Hsinchu (TW); Ming-Jer Tsai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 31 days.

(21) Appl. No.: 13/491,117

(22) Filed: Jun. 7, 2012

(65) Prior Publication Data

US 2013/0261963 A1    Oct. 3, 2013

(30) Foreign Application Priority Data

Mar. 30, 2012    (TW) .............................. 101111225 A (51) Int. Cl.
| | |
|---|---|
| *G01C 21/12* | (2006.01) |
| *G01C 21/26* | (2006.01) |
| *G01C 21/02* | (2006.01) |
| *G01P 3/66* | (2006.01) |

(52) U.S. Cl.
CPC ............... G01C 21/26 (2013.01); *G01C 21/02* (2013.01); *G01P 3/66* (2013.01)
USPC ........... 701/484; 701/117; 701/118; 701/119; 701/408; 701/468; 340/901; 340/902; 340/905; 340/907

(58) Field of Classification Search
CPC ............ G01C 21/26; G01P 21/02; G01P 3/66
USPC ................... 701/24, 117, 118, 119, 409, 468; 709/217, 218, 219, 225, 245, 220, 221, 709/222, 223, 226, 227, 228, 229, 224; 340/10.2, 440, 901, 905, 928, 933, 340/990, 995.23, 902, 907; 370/244, 397, 370/440, 395.3; 342/42, 51, 357.31; 235/384; 73/116.06; 455/517; 379/211.02

See application file for complete search history.

(56) References Cited

U.S. PATENT DOCUMENTS

| | | | |
|---|---|---|---|
| 3,654,446 A * | 4/1972 | Gordon et al. ................... 702/94 |
| 5,099,245 A | 3/1992 | Sagey |
| 5,323,322 A | 6/1994 | Mueller et al. |
| 5,450,329 A | 9/1995 | Tanner |
| 5,654,908 A * | 8/1997 | Yokoyama ..................... 708/109 |
| 5,734,965 A * | 3/1998 | Kersken et al. ................. 455/45 |
| 6,259,377 B1 * | 7/2001 | Noecker et al. ................ 340/933 |
| 6,937,162 B2 * | 8/2005 | Tokitsu et al. ................. 340/928 |
| 7,277,809 B1 * | 10/2007 | DeWitt et al. .................... 702/96 |
| 7,711,480 B2 | 5/2010 | Robbins |
| 7,822,542 B2 * | 10/2010 | Mitsugi ......................... 701/438 |
| 7,984,184 B2 * | 7/2011 | Woon et al. .................... 709/245 |

(Continued)

*Primary Examiner* — McDieunel Marc
(74) *Attorney, Agent, or Firm* — Muncy, Geissler, Olds & Lowe, P.C.

(57) ABSTRACT

A road side data exchange net and method thereof is provided. The road side data exchange net includes a plurality of road side data exchange devices set on neighboring roads separately. The road side data exchange device includes a positioning system for receiving satellite data regularly, a calculator for calculating a calibration value of the satellite data to generate an analyzed result data, and a database for storing the analyzed result data. Further, each of the road side data exchange devices broadcasts the analyzed result data from its database to all of neighboring road side data exchange devices to provide the analyzed result data to an electronic device.

14 Claims, 6 Drawing Sheets

(56) References Cited

U.S. PATENT DOCUMENTS

| | | |
|---|---|---|
| 8,044,849 B2 | 10/2011 | Ferguson et al. |
| 2002/0032506 A1* | 3/2002 | Tokitsu et al. .................. 701/29 |
| 2008/0146157 A1* | 6/2008 | Aaron .......................... 455/66.1 |
| 2009/0190443 A1* | 7/2009 | Huizi et al. ..................... 368/10 |
| 2012/0133543 A1* | 5/2012 | Al-Khalefah et al. .......... 342/22 |

* cited by examiner

ROAD SIDE DATA EXCHANGE NET AND METHOD THEREOF

BACKGROUND OF THE INVENTION (a) Field of the Invention

The invention relates to an electronic device, particularly to a road side data exchange device.

(b) Description of the Related Art

The global positioning system (GPS) has been extensively used in daily life and the most commonly seen application is a vehicular positioning device for planning and navigating the destination and promoting traffic safety, etc. However, GPS cannot have positioning 100% precisely yet and have an error of about 10~15 meters without using calibration.

In order to perform more precisely satellite-based positioning, a calibration signal from a differential GPS should be received to do calibration. Reference stations are set and are used to acquire calibration values of the GPS positions so as to effectively calibrate errors caused by satellite electronic clocks, ephemeris, ionosphere and troposphere. However, the error caused by multipath still cannot be effectively improved. When a user is far away from the reference station, the differences of the terrain, weather or ionosphere data at which the user and the reference station are located are the major factors to cause the calibration result away from the expected value. Besides, the cost of setting up reference stations for the differential GPS is high and reference stations usually are set up in the spacious or boundless areas having few barriers, such as mountain or suburban areas to collect more complete satellite data.

In the differential GPS, after the server collects and compiles the data of each reference station, a user should acquire the real-time calibration data through a mobile network. However, since the city having larger traffic flow usually is farther away from the location where the reference station is set up, the difference of the satellite calibration data is larger and the vehicular positioning system cannot acquire the calibration value of its environment and only has the limited calibration result. Besides, when the vehicular positioning system acquires the calibration data, the calibration data needs to be downloaded from the server through a 3G network and the cost of the network connection is needed. If there are many users downloading at the same time, the server may be overloaded to cause a service problem.

BRIEF SUMMARY OF THE INVENTION

One object of the invention is to provide a road side data exchange device for providing a data exchange mechanism to exchange data between road side data exchange devices so as to promote the positioning precision of a vehicular positioning device.

An embodiment of the invention provides a road side data exchange net. The road side data exchange net includes a plurality of road side data exchange devices, disposed on neighboring roadsides separately. The road side data exchange device includes a positioning system for receiving satellite data regularly or periodically; a calculator for calculating a calibration value of the satellite data to generate an analyzed result data; and a database for storing the analyzed result data. Each of the road side data exchange device broadcasts the analyzed result data from its database to all of neighboring road side data exchange devices to supply the analyzed result data to an electronic device.

Another embodiment of the invention provides a method of road side data exchange. The method includes the following steps. At first, a plurality of road side data exchange devices are provided separately on road sides to exchange satellite calibration data to form a road side data exchange net. Then, an electronic device is provided to search the nearest road side data exchange device. Communication with the nearest road side data exchange device is performed via a preset communication protocol to acquire the satellite calibration data. A satellite positioning data is calibrated according to the satellite calibration data. Then, satellite positioning is performed according the calibrated satellite positioning data.

The embodiments of the invention provide a road side data exchange net and a method of road side data exchange. The road side data exchange devices disposed in the city can receive the observation data of GPS and the road side data exchange devices can be further connected in a net to exchange data through wireless transmission. The positioning device communicates with the road side data exchange devices through a dedicated short range communication (DSRC) protocol to acquire a calibration value suitable for that area so as to spare the cost of connecting to a mobile network for acquiring the calibration data from the server. Besides, the satellite positioning precision can be increased.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

Figure 1A:
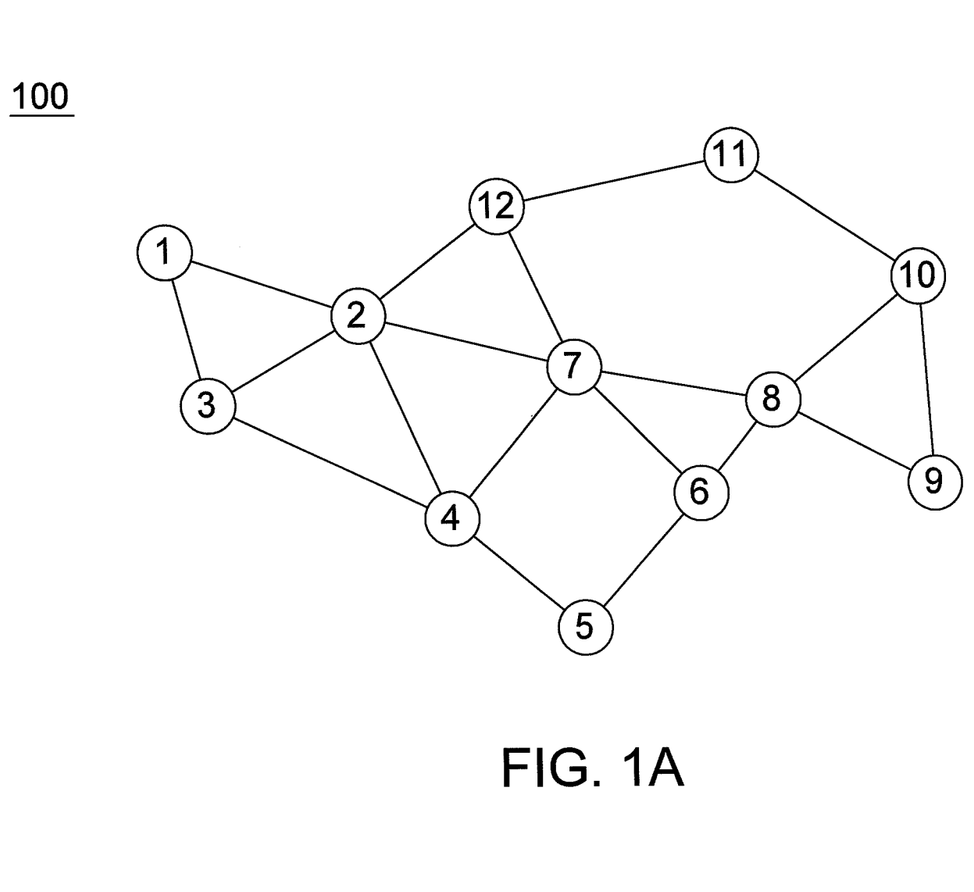
FIG. 1A shows a schematic diagram illustrating a road side data exchange net according to an embodiment of the invention.
Figure 1B:
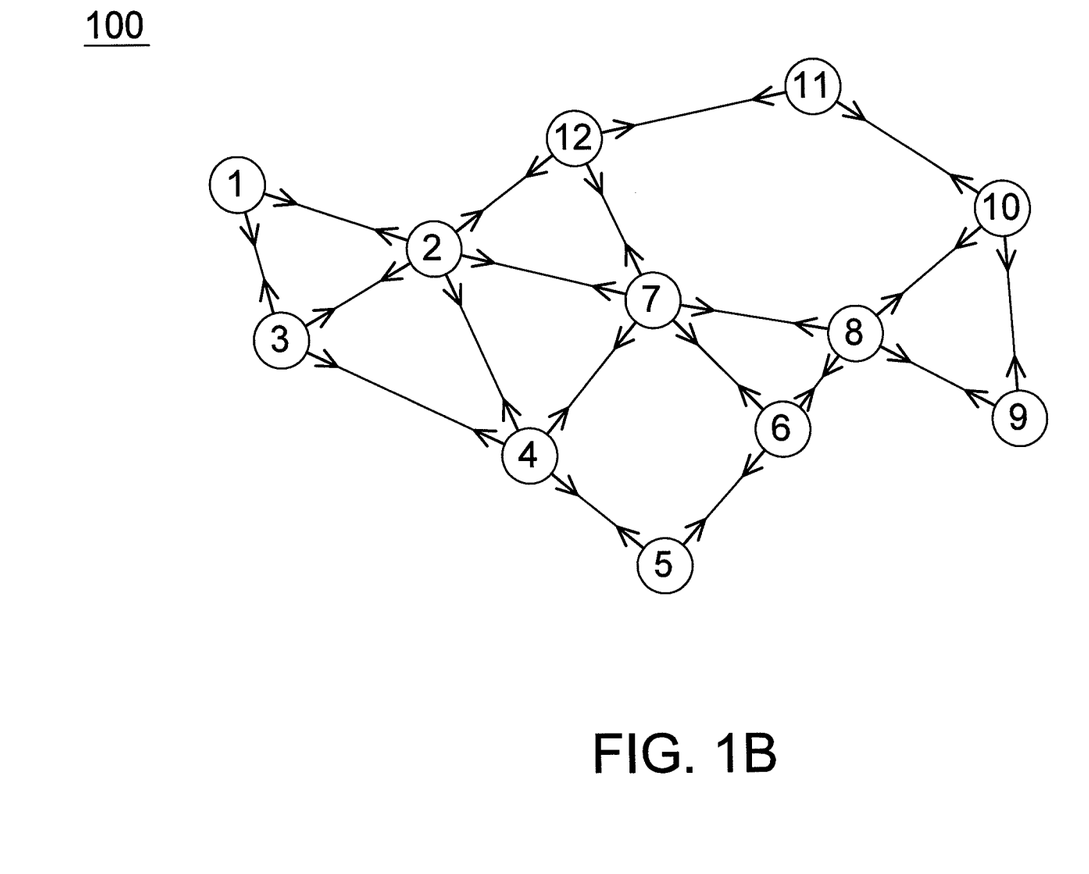
FIG. 1B shows a schematic diagram illustrating a road side data exchange net according to another embodiment of the invention.

FIGS. 1A and 1B show schematic diagrams illustrating a road side data exchange net according to an embodiment of the invention. The road side data exchange net 100 includes a plurality of road side data exchange devices, for example, the road side data exchange devices 1~12. In an embodiment, the road side data exchange devices 1~12 may be low-cost small collection stations. For example, road site units (RSU) may be used for assisting the current reference stations of the differential GPS (DGPS). The small collection station is a device having a known precise position and may acquire the satellite data from GPS.

As shown in FIG. 1A, the road side data exchange devices 1~12 can be scattered disposed separately on neighboring roadsides for receiving satellite data regularly or periodically and broadcasting to all of neighboring road side data exchange devices to form the satellite data exchange network shown in FIG. 1B. Accordingly, the road side data exchange devices 1~12 can effectively exchange the satellite data through networks to have each road side data exchange device possess more complete satellite data. An electronic device of a user may use a preset communication method to receive the calibration data from the road side data exchange devices 1~12 to achieve the effect of acquiring real-time calibration data at that location and sparing the cost of mobile network connection.

In an embodiment, the electronic device may use a dedicated short range communication (DSRC) protocol to communicate with the road side data exchange devices. The invention is not limited to this example. Any current or future to-be-developed communication method may be used in communication of the present invention. In addition, the electronic device of this embodiment may be any mobile positioning device, such as onboard unit (OBU) in a vehicular, or any portable positioning device, etc. It should be noted that the number and types of road side data exchange devices are not limited to the above example and can be adjusted according to actual needs.

Figure 2A:
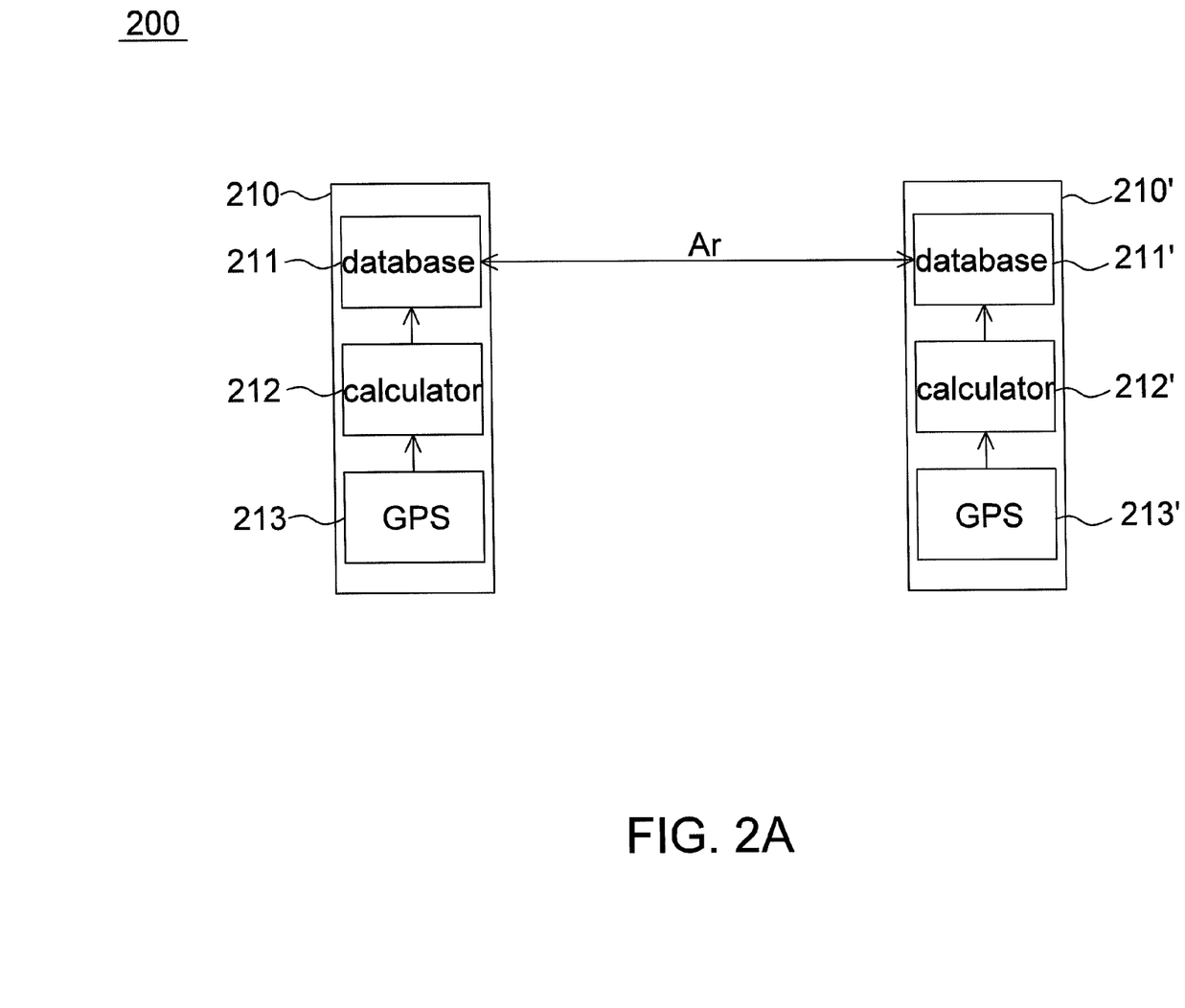
FIG. 2A shows a schematic diagram illustrating a road side data exchange device according to an embodiment of the invention.

FIG. 2A shows a schematic diagram illustrating a road side data exchange net 200 according to an embodiment of the invention. The road side data exchange net 200 includes a plurality of road side data exchange devices 210, 210' . . . , disposed separately on neighboring roadsides to form a net. The road side data exchange devices 210, 210' . . . may be any current or future to-be-developed small collection stations. Since the structures and operation methods of the road side data exchange devices 210 and 210' are the same, only the road side data exchange device 210 is illustrated.

The road side data exchange device 210 includes a global positioning system (GPS) 213, a calculator 212 and a database 211. The GPS 213 receives satellite data regularly or periodically. The calculator 212 calculates a calibration value of the satellite data to generate an analyzed result data Ar. In an embodiment, the analyzed result data Ar may be a GPS error calibration value. The database 211 stores the analyzed result data Ar. Each of the road side data exchange devices 210 broadcasts the analyzed result data Ar from its database 211 to the database 211' of all of neighboring road side data exchange devices 210' to exchange data with the other road side data exchange devices so as to form a data exchange net.

Figure 2B:
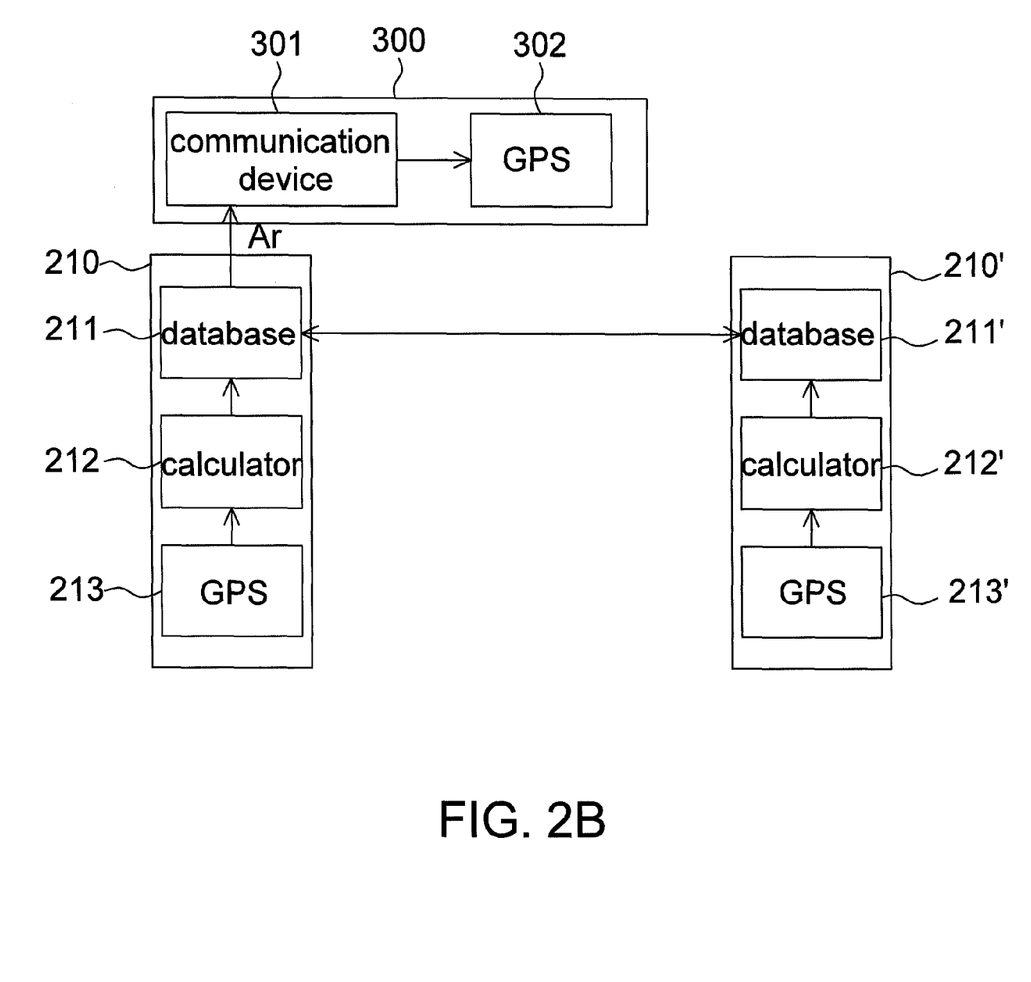
FIG. 2B shows a schematic diagram illustrating a road side data exchange device and an electronic device according to an embodiment of the invention.

As shown in FIG. 2B, when an electronic device 300 is near any road side data exchange device 210, the electronic device 300 may receive the analyzed result data Ar to achieve the effect of calibrating the GPS signal to have more precise satellite positioning. In an embodiment, the electronic device 300 includes a communication device 301 and a global positioning system (GPS) 302. The communication device 301 receives at least one of the analyzed result data Ar of the database 211. The GPS 302 uses the analyzed result data Ar to perform satellite positioning.

In an embodiment, the electronic device 300 may be disposed in a vehicle. In another embodiment, the electronic device 300 may be a portable device or a vehicular device. When the electronic device 300 is a vehicular device, the communication device 301 may be an onboard unit (OBU). The onboard unit may use a dedicated short range communication (DSRC) protocol to communicate with at least one road side data exchange device 210.

By the above method, the electronic device 300 may communicate with the road side data exchange net of the invention to acquire a precise GPS signal to have a better satellite positioning effect.

Figure 3:
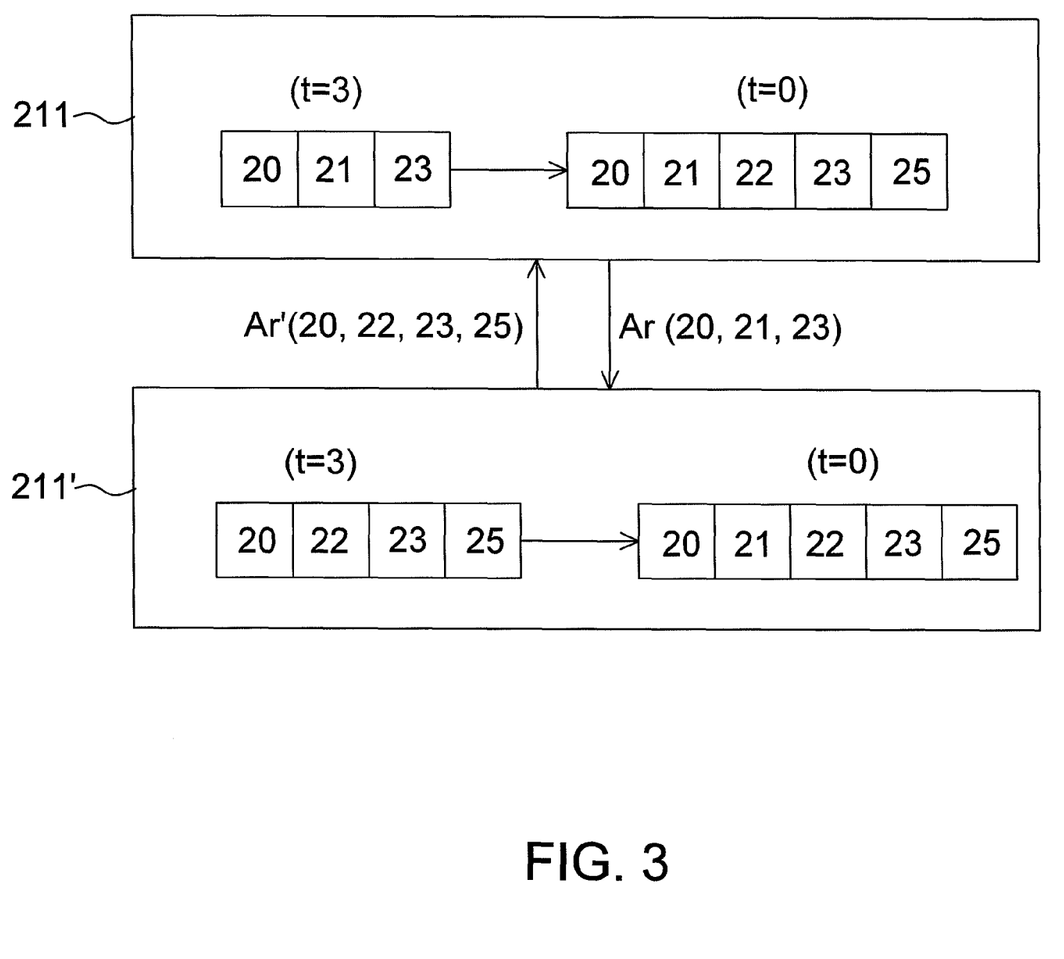
FIG. 3 shows a schematic diagram illustrating a timer of a database according to an embodiment of the invention.

In an embodiment, as shown in FIG. 3, the databases 211, 211', . . . of the road side data exchange devices 210, 210' . . . of the invention each include a timer. The timer is used to set the period of broadcasting to the road side data exchange devices so that the analyzed result data Ar is broadcasted every a preset period of time. For example, when the timer of the database 211 counts down from t=3 to t=0, the analyzed result data Ar is broadcasted where the content of Ar is the $20^{th}$, $21^{st}$ and $23^{rd}$ satellite calibration values, and the analyzed result data Ar' broadcasted by 211' is received by the database 211 at the same time where the content of Ar' is the $20^{th}$, $22^{nd}$, $23^{rd}$ and $25^{th}$ satellite calibration values. When the timer of the database 211' counts down from t=3 to t=0, the analyzed result data Ar' is broadcasted where the content of Ar' is the $20^{th}$, $22^{nd}$, $23^{rd}$ and $25^{th}$ satellite calibration values, and the analyzed result data Ar broadcasted by 211 is received by the database 211' at the same time where the content of Ar is the $20^{th}$, $21^{st}$ and $23^{rd}$ satellite calibration values. Accordingly, the road side data exchange devices may broadcast periodically at different time.

Figure 4:
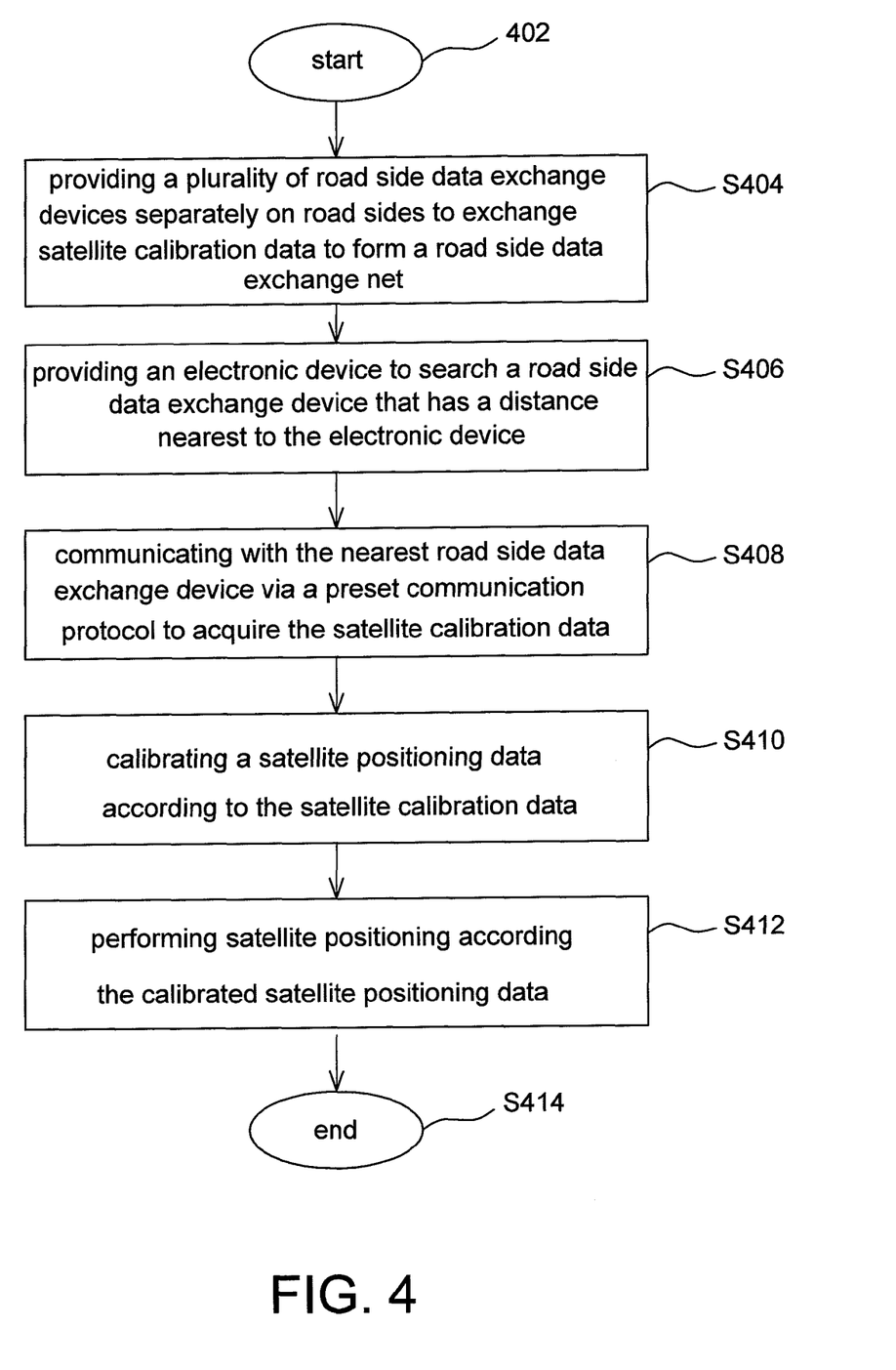
FIG. 4 shows a flow chart illustrating a method for road side data exchange according to an embodiment of the invention.

FIG. 4 shows a flow chart illustrating a method for road side data exchange according to an embodiment of the invention. The method includes the following steps:

Step S402: start;

Step S404: providing a plurality of road side data exchange devices separately on road sides to exchange satellite calibration data to form a road side data exchange net where, in an embodiment, the road side data exchange device may be a small collection station;

Step S406: providing an electronic device to search a road side data exchange device that has a distance nearest to the electronic device where, in an embodiment, the electronic device may be a portable device or a vehicular communication device;

Step S408: communicating with the nearest road side data exchange device via a preset communication protocol to acquire the satellite calibration data where, in an embodiment, the preset communication protocol may be a dedicated short range communication (DSRC) protocol;

Step S410: calibrating a satellite positioning data according to the satellite calibration data;

Step S412: performing satellite positioning according the calibrated satellite positioning data;

Step S414: end.

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A road side data exchange net, comprising:
a plurality of road side data exchange devices, disposed on neighboring roads separately wherein the road side data exchange device comprises:
a positioning system for receiving satellite data periodically;
a calculator for calculating a calibration value of the satellite data to generate an analyzed result data; and
a database for storing the analyzed result data;
wherein each of the road side data exchange devices broadcasts the analyzed result data from its database to all of neighboring road side data exchange devices to supply the analyzed result data to an electronic device.

2. The net according to claim 1, wherein the electronic device comprises:
a communication device, for receiving at least one of the analyzed result data of the database; and
a global positioning system, using the analyzed result data to perform satellite positioning.

3. The net according to claim 2, wherein the electronic device is disposed in a vehicle.

4. The net according to claim 3, wherein the electronic device is a vehicular device.

5. The net according to claim 4, wherein the communication device is an onboard unit and the onboard unit uses a dedicated short range communication (DSRC) protocol to communicate with at least one of the neighboring road side data exchange device.

6. The net according to claim 2, wherein the electronic device is a portable device.

7. The net according to claim 1, wherein the road side data exchange device broadcasts the analyzed result data every a preset period of time to have the road side data exchange devices exchange the analyzed result data in their databases.

8. The net according to claim 7, wherein the database comprises a timer to set the preset period of time.

9. The net according to claim 1, wherein the road side data exchange device is a small collection station.

10. The net according to claim 1, wherein the analyzed result data is a positioning error calibration value.

11. A method of road side data exchange, comprising:
providing a plurality of road side data exchange devices separately disposed on road sides to exchange satellite calibration data through broadcasting to form a road side data exchange net;
providing an electronic device to search a road side data exchange device having the nearest distance with the electronic device;
communicating with the nearest road side data exchange device via a preset communication protocol to acquire the satellite calibration data by a processor;
calibrating satellite positioning data according to the satellite calibration data; and
performing satellite positioning according the calibrated satellite positioning data.

12. The method according to claim 11, wherein the road side data exchange device is a small collection station.

13. The method according to claim 11, wherein the electronic device is a vehicular communication device.

14. The method according to claim 11, wherein the preset communication protocol is a dedicated short range communication (DSRC) protocol.

* * * * *